United States Patent
Schilling

(10) Patent No.: US 7,374,404 B2
(45) Date of Patent: May 20, 2008

(54) METHODS AND APPARATUS FOR GAS TURBINE ENGINES

(75) Inventor: Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 20 days.

(21) Appl. No.: 11/232,786

(22) Filed: Sep. 22, 2005

(65) Prior Publication Data
US 2007/0065292 A1    Mar. 22, 2007

(51) Int. Cl.
*F01D 25/02* (2006.01)

(52) U.S. Cl. .............................. 416/229 R; 416/229 A; 416/241 A

(58) Field of Classification Search ............ 416/241 A, 416/229 R, 229 A
See application file for complete search history.

(56) References Cited

U.S. PATENT DOCUMENTS

| | | | |
|---|---|---|---|
| 3,178,560 A * | 4/1965 | Mapp et al. ................ | 219/528 |
| 3,925,979 A | 12/1975 | Ziegler | |
| 5,123,814 A * | 6/1992 | Burdick et al. ............. | 416/224 |
| 5,160,248 A | 11/1992 | Clarke | |
| 6,371,411 B1 | 4/2002 | Breer et al. | |
| 6,457,676 B1 | 10/2002 | Breer et al. | |
| 6,669,447 B2 * | 12/2003 | Norris et al. ................ | 416/224 |
| 6,688,558 B2 | 2/2004 | Breer et al. | |
| 6,920,748 B2 | 7/2005 | Ackerman et al. | |
| 6,960,065 B2 * | 11/2005 | Leach .................... | 416/229 R |
| 7,097,783 B2 * | 8/2006 | Wayte ........................ | 216/84 |
| 2005/0039435 A1 | 2/2005 | Ackerman et al. | |
| 2005/0050877 A1 | 3/2005 | Venkataramani et al. | |

\* cited by examiner

*Primary Examiner*—Ninh H. Nguyen
(74) *Attorney, Agent, or Firm*—William Scott Andes, Esq.; Armstrong Teasdale LLP

(57) ABSTRACT

A method for assembling a turbine engine to facilitate preventing ice accumulation on the turbine engine during engine operation, the gas turbine engine including a fan assembly. The method includes coupling a plurality of fan blades to a fan rotor, and applying a polyurethane material to at least a portion of at least one of the fan blades to facilitate preventing ice accumulation on the at least one fan blade.

17 Claims, 5 Drawing Sheets

METHODS AND APPARATUS FOR GAS TURBINE ENGINES

BACKGROUND OF THE INVENTION

This invention relates generally to gas turbine engines, and more particularly, to methods and apparatus for operating gas turbine engines.

Gas turbine engines typically include an inlet, a fan, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

When engines operate in icing conditions, i.e., exposed to clouds of super-cooled water droplets, ice may accumulate on exposed engine structures. More specifically, if engines are operated within icing conditions at low power for extended periods of time, ice accumulation within the engine and over exposed engine structures may be significant. Over this time, large quantities of ice can accrete and may cause high engine vibrations until the ice is shed. This ice may enter the high pressure compressor. Such a condition, known as a shed cycle, may cause the compressor discharge temperature to be suddenly reduced. In response to the sudden decrease in compressor discharge temperature, the corrected core speed increases in the aft stages of the high pressure compressor. This sudden increase in aft stage corrected core speed may adversely impact compressor stall margin. In some cases, it may also lead to compressor stall.

To facilitate preventing ice accretion within the engine and over exposed surfaces adjacent the engine, at least some known engines include a control system that enables the engine to operate with an increased operating temperature and may include sub-systems that direct high temperature bleed air from the engine compressor to provide heat to the exposed surfaces. However, the increased operating temperature and the bleed systems may decrease engine performance. Such systems may also require valves to turn off the flow of the high temperature air during take-off and other high power operations to protect the engine. In addition to the increased cost, such valving may pose a reliability problem. As such, to further facilitate preventing ice accumulation, at least some known engines are sprayed with a deicing solution prior to operation. However, during flight, de-icing solutions are not applied. More specifically, during flight, evaporative cooling may still cause freezing and ice accumulation over external engine surfaces, such as a front frame of the engine. Conventional electrical heating is an option, but it requires electricity for performing the de-icing operation and may require relatively large generators at low speed conditions, electrical circuits, and complex interactive logic with the airplane's computers with the attendant increased cost, weight and performance penalties.

BRIEF SUMMARY OF THE INVENTION

In one aspect, a method for assembling a turbine engine is provided. The method includes coupling a plurality of fan blades to a fan rotor, and applying a polyurethane material to at least a portion of at least one of the fan blades to facilitate preventing ice accumulation on the at least one fan blade.

In another aspect, a fan assembly for a gas turbine engine is provided. The fan assembly includes a fan rotor disk, a plurality of fan blades coupled to the fan rotor disk, and a polyurethane material applied to at least a portion of at least one of the fan blades to facilitate preventing ice accumulation on the at least one the fan blade.

In a further aspect, a gas turbine engine assembly is provided. The gas turbine engine assembly includes a core gas turbine engine, and a fan assembly coupled to the core gas turbine engine. The fan assembly includes a fan rotor disk, a plurality of fan blades coupled to the fan rotor disk, the plurality of fan blades fabricated at least partially from a titanium material, and a polyurethane material applied to at least a portion of at least one of the fan blades to facilitate preventing ice accumulation on the at least one the fan blade.

DETAILED DESCRIPTION OF THE INVENTION

Figure 1:
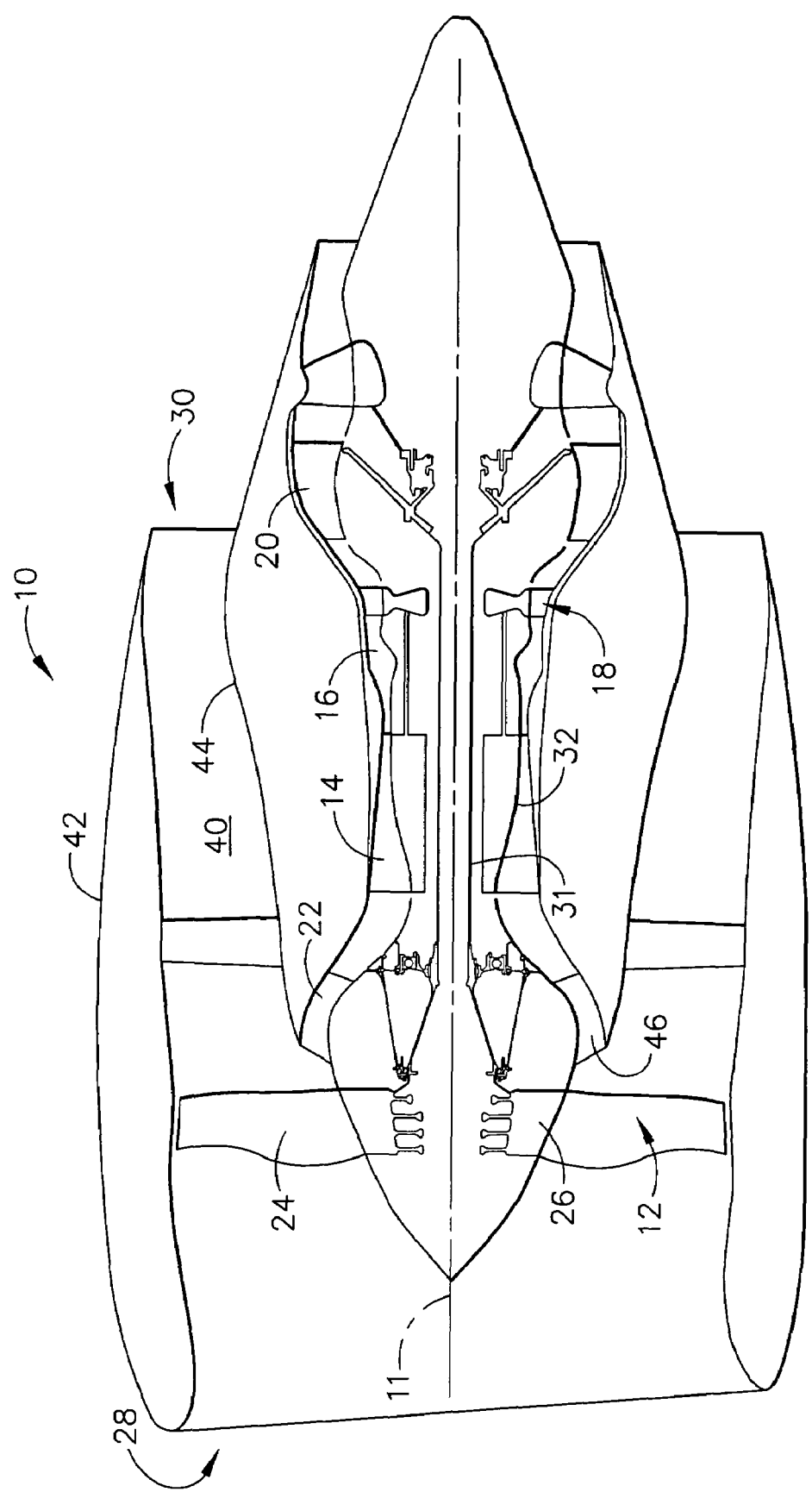
FIG. 1 is a schematic illustration of an exemplary gas turbine engine.

FIG. 1 is a schematic illustration of an exemplary gas turbine engine assembly 10 having a longitudinal axis 11. Gas turbine engine assembly 10 includes a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disk 26. Engine 10 has an intake side 28 and an exhaust side 30. In the exemplary embodiment, the gas turbine engine is a GE90 available from General Electric Company, Cincinnati, Ohio. Fan assembly 12, booster 22, and turbine 20 are coupled together by a first rotor shaft 31, and compressor 14 and turbine 18 are coupled together by a second rotor shaft 32.

In operation, air flows through fan assembly 12 and compressed air is supplied to high pressure compressor 14 through booster 22. The booster discharge air is further compressed and delivered to combustor 16. Hot products of combustion (not shown in FIG. 1) from combustor 16 are utilized to drive turbines 18 and 20, and turbine 20 is utilized to drive fan assembly 12 and booster 22 by way of shaft 31. Engine 10 is operable at a range of operating conditions between design operating conditions and off-design operating conditions.

In the exemplary embodiment, a bypass duct 40 is utilized to bypass a portion of the airflow from fan assembly 12 around gas turbine engine 10. More specifically, bypass duct 40 is defined between an outer casing 42 and a splitter 44 that substantially circumscribes booster 22. Accordingly, a first portion of the airflow compressed by fan assembly 12 is divided between bypass duct 40 and an inlet 46 to the booster 22 utilizing splitter 44 coupled upstream from gas turbine engine 10.

Figure 2:
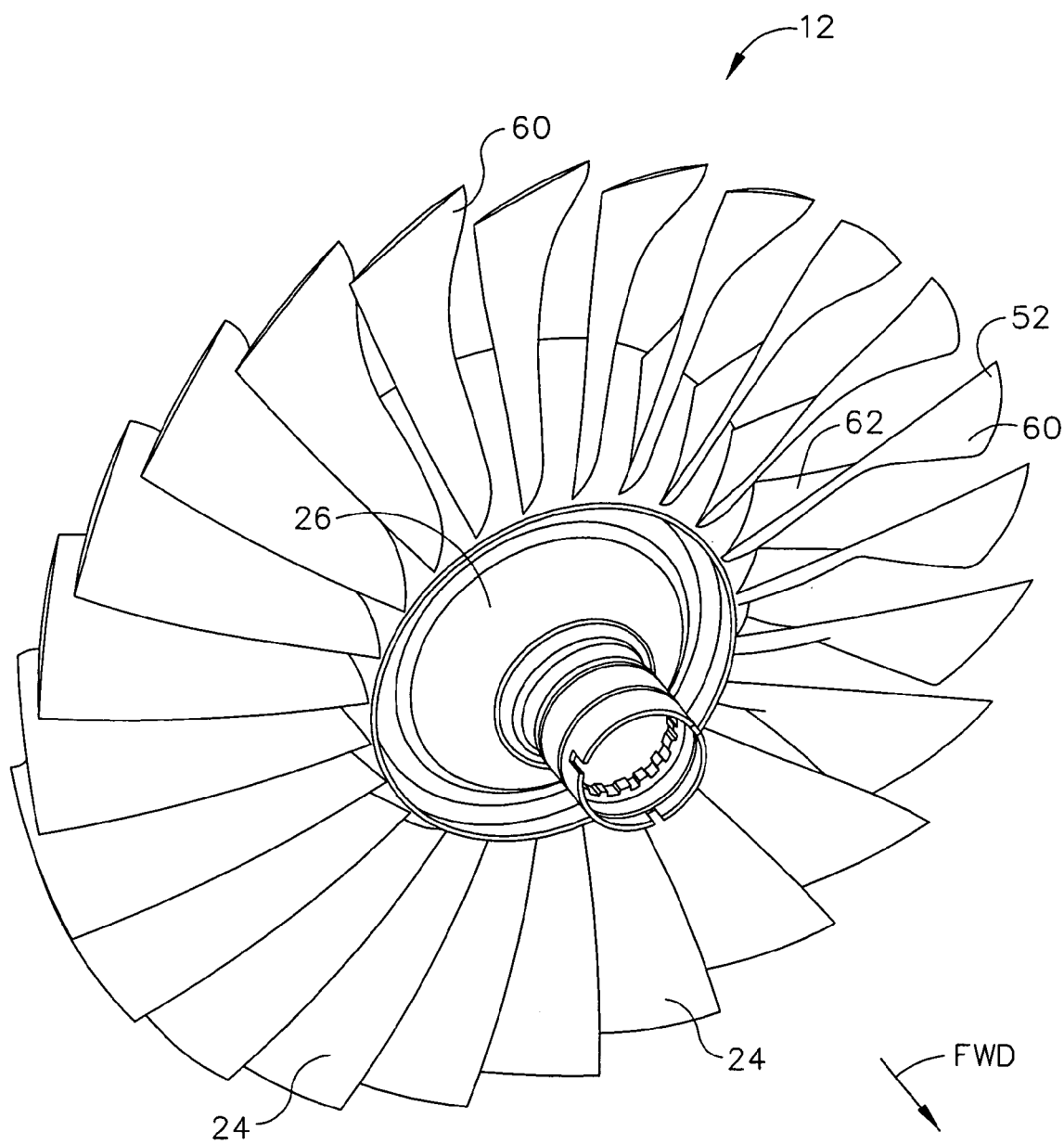
FIG. 2 is a perspective view of the fan assembly shown in FIG. 1.
Figure 3:
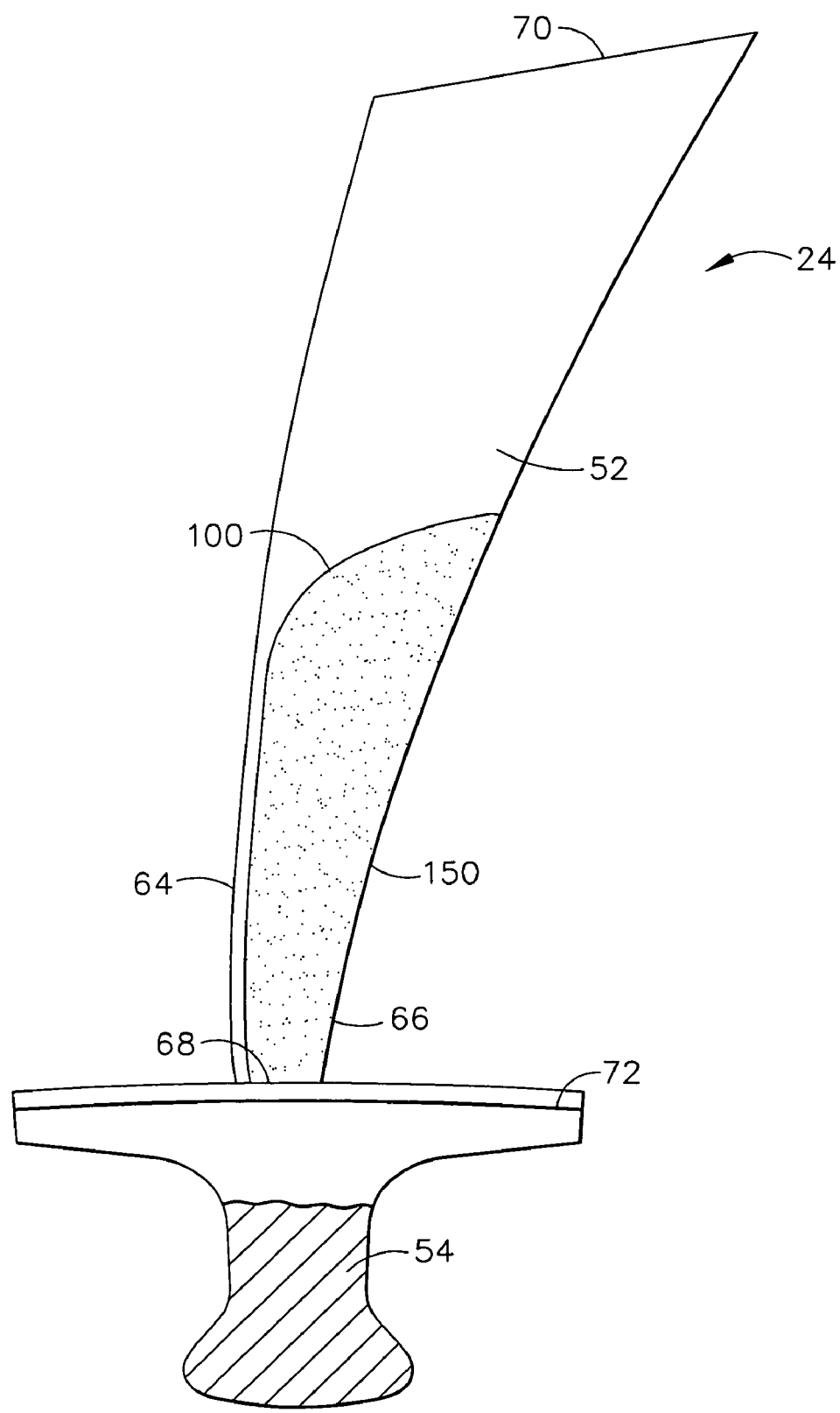
FIG. 3 is a forward view of the exemplary fan blade shown in FIG. 2.

FIG. 2 is a perspective view of fan assembly 12 shown in FIG. 1. FIG. 3 is an aft looking forward view of fan blade

Figure 4:
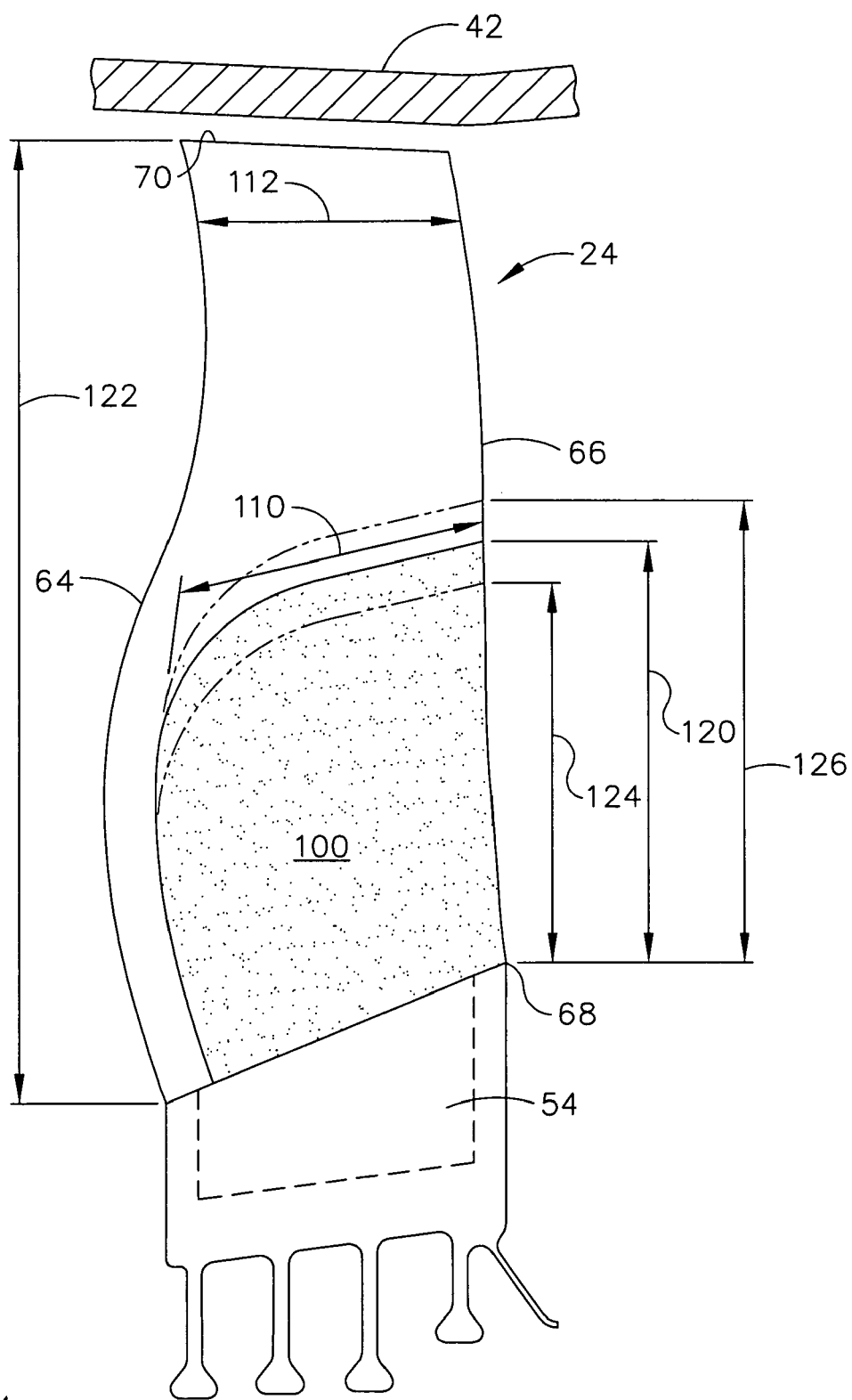
FIG. 4 is a side elevation view of the fan blade shown in FIG. 3.
Figure 5:
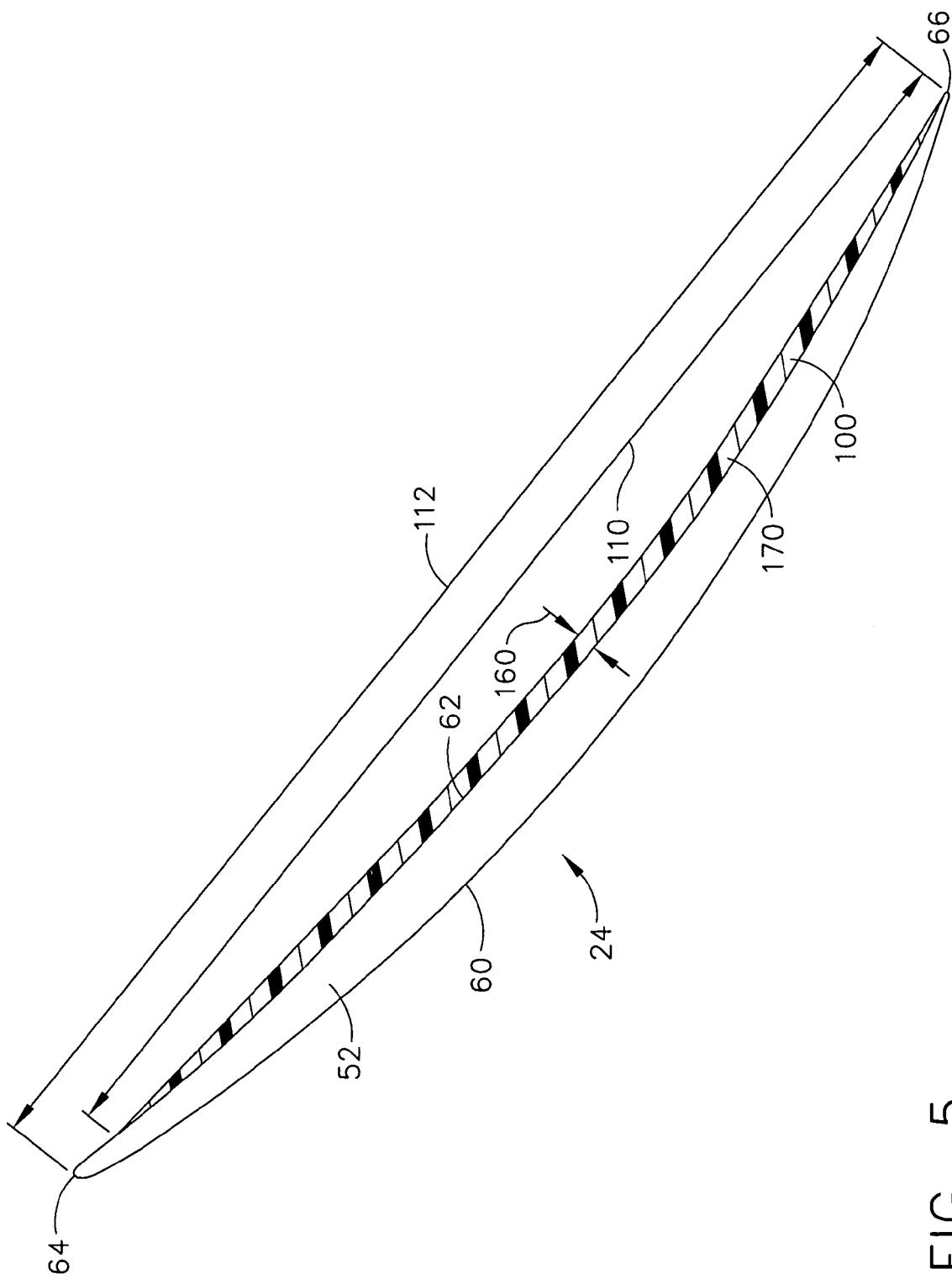
FIG. 5 is a sectional view of the fan blade shown in FIG. 3.

24 shown in FIG. 2. FIG. 4 is a side elevation view of fan blade 24. FIG. 5 is a sectional view of fan blade 24. Each fan blade 24 includes an airfoil 52 and an integral dovetail 54 that is used for mounting airfoil 52 to a rotor disk, such as rotor disk 26 (shown in FIG. 1) in a known manner.

Each airfoil 52 includes a first contoured sidewall 60 and a second contoured sidewall 62. First sidewall 60 is convex and defines a suction side of airfoil 52, and second sidewall 62 is concave and defines a pressure side of airfoil 52. Sidewalls 60 and 62 are joined at a leading edge 64 and at an axially-spaced trailing edge 66 of airfoil 52. More specifically, airfoil trailing edge 66 is spaced chordwise and downstream from airfoil leading edge 64. First and second sidewalls 60 and 62, respectively, extend longitudinally or radially outward in span from a blade root 68 positioned adjacent dovetail 54, to an airfoil tip 70. A dovetail platform 72 is positioned at blade root 68 and extends radially outward from first and second sidewalls 60 and 62, respectively.

The general configuration of each fan blade 24 may take any conventional form with or without the platform 72 or the dovetail 54. For example, fan blade 24 may be alternatively formed integrally with the disk 26 as one assembly conventionally referred to as a blisk without a discrete and removable dovetail 54. Fan blade 24 may also be of the conventional solid-type or hollow-type as desired. In the exemplary embodiment, each fan blade 24 is fabricated utilizing a metallic material such as, but not limited to, titanium. In an alternative embodiment, each fan blade 24 is fabricated utilizing a composite material.

Moreover, although the invention is described herein with respect to fan blade 24, it should be realized that the invention can be applied to any blades utilized within a gas turbine engine such as, but not limited to booster compressor blades.

Accordingly, and in the exemplary embodiment, each fan blade 24 includes a material 100 that is affixed to at least a portion of fan blade 24 to facilitate shedding any ice that may form and/or accumulate on fan blade 24. More specifically, and in the exemplary embodiment, material 100 is a material which has a lower ice adhesion characteristic than the parent material. For example, in the exemplary embodiment, a polyurethane material is affixed to second sidewall 62, i.e. the pressure side of airfoil 52. Polyurethane as used herein is defined as any polymer that includes a chain of organic units joined by urethane links.

In the exemplary embodiment, material 100 has a width 110 that is between approximately 85% and approximately 95% of a width 112 of airfoil 52. More specifically, material 100 is applied to airfoil 52 such that material 100 extends substantially from airfoil trailing edge 66 at least partially towards leading edge 64. In the exemplary embodiment, material 100 is not carried to leading edge 64 due to the erosion seen at leading edge 64 and between approximately 5% and approximately 15% aft of leading edge 64. Accordingly, and in the exemplary embodiment, material 100 has a width 110 that is between approximately 85% and approximately 95% of airfoil width 112.

Moreover, material 100 also has a length 120 that extends radially outwardly in span from blade root 68 at least partially towards airfoil tip 70. In the exemplary embodiment, length 120 is selected based on the centrifugal load, i.e. the centrifugal force experienced by the ice accumulated on fan blade 24 during engine icing conditions. The centrifugal force is defined as a function of the mass of the ice, the radius at which the ice accumulates on fan blade 24, and the tangential velocity of fan blade 24 at the specified radius. Accordingly, length 120 is pre-selected for each gas turbine engine based on the estimated force (I) required to dislodge any accumulated ice build-up on fan blade 24. In the exemplary embodiment, length 120 is approximately one-third of a length 122 of airfoil 52. In another exemplary embodiment, length 120 is approximately one-half of a length 122 of airfoil 52 for a fan operating at a slower speed.

Thus, a first gas turbine engine operating within a first range of rotational speeds will include polyurethane material 100 having a length 120 affixed to each fan blade 24. Whereas, a second gas turbine engine operating within a second range of rotational speeds, that is less than the first range of rotational speeds, will include polyurethane material 100 having a second length 126, that is greater than length 120, affixed to each fan blade 24 since the force available to dislodge the accumulated ice from fan blade 24 is reduced when the engine is operating at a reduced speed. Additionally, a third gas turbine engine operating within a third range of rotational speeds, that is greater than the first range of rotational speeds, will include polyurethane material 100 having a third length 124, that is less than length 120, affixed to each fan blade 24 since the force available to dislodge the accumulated ice from fan blade 24 is greater when the engine is operating at increased rotational speeds.

During assembly, material 100 is affixed or applied to each fan blade 24. More specifically, and in one embodiment, material 100 is a sprayed-on material 150 that applied to fan blade 24 using a typical painting process. In one embodiment, material 150 is applied to fan blade 24 such that material 150 is between approximately 3 mils, i.e. three one-thousandths of an inch, and approximately 10 mils thick. In the exemplary embodiment, material 150 has a thickness 160 that is approximately five mils. In another embodiment, material 100 is a sheet 170 of polyurethane material that is applied to fan blade 24. In the exemplary embodiment, sheet 170 has a thickness 160 that is between approximately five mils and approximately twenty mils. During assembly, material 100 is tapered and/or feathered to form a relatively smooth transition from the metallic surface of blade 24 to the full thickness 160 of material 100 aft of leading edge 64 and at the full thickness 160 of material 100.

The above-described ice protection material is affixed to at least one gas turbine blade to facilitate shedding any ice that may accumulated on the gas turbine blade. In the exemplary embodiment, the ice protection material is applied to a plurality of gas turbine engine fan blades. The above-described ice-protection material is cost-effective and highly reliable in facilitating the prevention of ice accumulation along exposed surfaces of the engine. More specifically, the polyurethane ice protection material is applied to the fan blade pressure side as either a film or a spray on material to a width that is selected based on the G-load that the specific gas turbine fan blade is expected to realize. Accordingly, in the exemplary embodiment described herein, the polyurethane material is applied to the lower one-third of the pressure side of the blade and extends between approximately 85% and approximately 95% from the trailing edge of the fan blade towards the leading edge of the fan blade.

As a result, an ice protection material is provided which facilitates reducing the adhesive strength of the ice which may form on the fan blade by approximately 50%. Thus ice forming on the fan blades will shed sooner with less residual unbalance between sheds compared to non-treated systems.

Exemplary embodiments of an ice protection material are described above in detail. The ice protection material is not limited to the specific embodiments described herein, but rather, the polyurethane ice protection material may be applied to any portion of the gas turbine engine to facilitate ice shedding. For example, the ice protection material may be applied to portions of the booster compressor, splitter, and/or portions of the fan shroud.

While the invention has been described in terms of various specific embodiments, those skilled in the art will recognize that the invention can be practiced with modification within the spirit and scope of the claims.

What is claimed is:

1. A method for assembling a turbine engine to facilitate preventing ice accumulation on the turbine engine during engine operation, the gas turbine engine including a fan assembly, said method comprising:

coupling a plurality of fan blades to a fan rotor, wherein each of the plurality of fan blades has a length that extends from an airfoil root radially outwardly to an airfoil tip; and applying a polyurethane material to at least a portion of at least one of the fan blades to facilitate preventing ice accumulation on the at least one fan blade, the polyurethane material having a length selected based on the centrifugal force experienced by the ice accumulated on the at least one fan blade during icing conditions, wherein the polyurethane material is applied to that portion of at least one of the fan blades that extends from a distance aft of a leading edge of the blade towards a trailing edge of the blade.

2. A method in accordance with claim 1 wherein coupling a plurality of fan blades to a fan rotor further comprises coupling a plurality of titanium fan blades to the fan rotor.

3. A method in accordance with claim 1 wherein the fan blade has a width that extends from an airfoil leading edge to an airfoil trailing edge, said method further comprises applying a polyurethane material having a second width that is between approximately 85% and approximately 95% of the airfoil width to the fan blade airfoil.

4. A method in accordance with claim 1 wherein applying a polyurethane material further comprises applying at least one of a polyurethane spray coating and a polyurethane film to that at least one fan blade.

5. A method in accordance with claim 4 further comprising applying at least one of a polyurethane spray coating and a polyurethane film to the at least one fan blade such that the polyurethane material has a thickness between approximately three one-thousandths of an inch and approximately twenty one-thousandths of an inch.

6. A method in accordance with claim 1 wherein applying a polyurethane material further comprises applying the polyurethane material to have a length that is approximately one-third of an airfoil width of the fan blade airfoil.

7. A fan assembly for a gas turbine engine comprising:
a fan rotor disk;
a plurality of fan blades coupled to said fan rotor disk, wherein each of said plurality of fan blades has a length that extends from an airfoil root radially outwardly to an airfoil tip; and
a polyurethane material applied to at least a portion of at least one of said fan blades to facilitate preventing ice accumulation on the at least one said fan blade, the polyurethane material having a length selected based on the centrifugal force experienced by the ice accumulated on at least one of said fan blades during engine icing conditions, wherein said at least a portion of at least one of said fan blades extends from a distance aft of a leading edge of said blade towards a trailing edge of said blade.

8. A fan assembly in accordance with claim 7 wherein said plurality of fan blades comprise a plurality of titanium fan blades.

9. A fan assembly in accordance with claim 7 wherein each said fan blade has a width that extends from an airfoil leading edge to an airfoil trailing edge, said polyurethane material having a second width that is between approximately 85% and approximately 95% of the airfoil width.

10. A fan assembly in accordance with claim 7 wherein said polyurethane material further comprises at least one of a polyurethane spray coating and a polyurethane film.

11. A fan assembly in accordance with claim 10 wherein at least one of said polyurethane spray coating and said polyurethane film has a thickness between approximately three one-thousandths of an inch and approximately twenty one-thousandths of an inch.

12. A fan assembly in accordance with claim 7 wherein said polyurethane material further comprises a length that is approximately one-third of an airfoil width of said fan blade airfoil.

13. A gas turbine engine assembly comprising:
a core gas turbine engine; and
a fan assembly coupled to said core gas turbine engine comprising:
a fan rotor disk;
a plurality of fan blades coupled to said fan rotor disk, wherein each of said plurality of fan blades has a length that extends from an airfoil root radially outwardly to an airfoil tip, said plurality of fan blades fabricated at least partially from a titanium material; and
a polyurethane material applied to at least a portion of at least one of said fan blades to facilitate preventing ice accumulation on the at least one said fan blade, the polyurethane material having a length selected based on the centrifugal force experienced by the ice accumulated on at least one of said fan blades during engine icing conditions, wherein said at least a portion of at least one of said fan blades extends from a distance aft of a leading edge of said blade towards a trailing edge of said blade.

14. A gas turbine engine assembly in accordance with claim 13 wherein each said fan blade has a width that extends from an airfoil leading edge to an airfoil trailing edge, said polyurethane material having a second width that is between approximately 85% and approximately 95% of the airfoil width.

15. A gas turbine engine assembly in accordance with claim 13 wherein said polyurethane material further comprises having a length that is approximately one-third of an airfoil width.

16. A gas turbine engine assembly in accordance with claim 13 wherein said polyurethane material further comprises at least one of a polyurethane spray coating and a polyurethane film.

17. A gas turbine engine assembly in accordance with claim 16 wherein at least one of said polyurethane spray coating and said polyurethane film has a thickness between approximately three one-thousandths of an inch and approximately twenty one-thousandths of an inch.

* * * * *

UNITED STATES PATENT AND TRADEMARK OFFICE
CERTIFICATE OF CORRECTION

PATENT NO. : 7,374,404 B2  Page 1 of 1
APPLICATION NO. : 11/232786
DATED : May 20, 2008
INVENTOR(S) : Schilling It is certified that error appears in the above-identified patent and that said Letters Patent is hereby corrected as shown below:

In the Specification, column 4, line 2, delete "force (I)" and insert therefor --force ($f$)--.
In Claim 1, column 5, line 24, delete "during icing" and insert therefor --during engine icing--.

Signed and Sealed this

Ninth Day of February, 2010

David J. Kappos
*Director of the United States Patent and Trademark Office*